United States Patent [19]

Dogliotti et al.

[11] 4,201,909
[45] May 6, 1980

[54] DATA-TRANSMISSION SYSTEM AND METHOD USING FIBER-OPTICAL TRANSMISSION

[75] Inventors: Renato Dogliotti; Giancarlo Pirani, both of Turin, Italy

[73] Assignee: CSELT - Centro Studi e Laboratori Telecomunicazioni S.p.A., Turin, Italy

[21] Appl. No.: 948,870

[22] Filed: Oct. 5, 1978

[30] Foreign Application Priority Data

Oct. 13, 1977 [IT] Italy .................. 69277 A/77

[51] Int. Cl.² .............................................. H04B 9/00
[52] U.S. Cl. ..................... 455/608; 340/347 DD; 358/262; 360/44; 455/612; 375/25
[58] Field of Search ............... 250/199; 340/347 DD; 360/44; 178/68; 358/262; 325/38 R

[56] References Cited

U.S. PATENT DOCUMENTS

| | | | |
|---|---|---|---|
| 3,281,806 | 10/1966 | Lawrance | 360/44 |
| 3,792,454 | 2/1974 | Lipp | 360/44 |
| 3,920,898 | 11/1975 | Torpie | 358/262 |
| 3,993,862 | 11/1976 | Karr | 358/262 |
| 4,008,390 | 2/1977 | Runge | 250/199 |
| 4,091,272 | 5/1978 | Richter | 250/199 |
| 4,101,934 | 7/1978 | Fukuoka | 178/68 |
| 4,103,234 | 7/1978 | Frazier | 340/347 DD |
| 4,153,814 | 5/1979 | Burgert | 178/68 |

*Primary Examiner*—Howard W. Britton
*Attorney, Agent, or Firm*—Karl F. Ross

[57] ABSTRACT

For the transmission of data by way of a fiber-optical path, three-bit code words representing eight different signal levels are generated in respective signal periods 2T and are converted into pairs of ternary luminous waveforms of duration T having two possible amplitude levels L (low) and H (high). Each waveform pair includes at least one but not more than two light pulses H, of a width not exceeding T/2, occurring in either of two time positions within a cycle T. At the receiving end, the incoming light pulses are modulated—either before or after conversion into electrical signals—with a ramp signal of recurrence period T which transposes the pulses H to either of two elevated amplitude levels depending upon their time position within a cycle, with the pulses L remaining at a low level. The resulting electrical pulses are integrated over successive periods equal to T and sampled in each of these periods for comparison with predetermined thresholds.

9 Claims, 12 Drawing Figures

DATA-TRANSMISSION SYSTEM AND METHOD USING FIBER-OPTICAL TRANSMISSION

FIELD OF THE INVENTION

Our present invention relates to a method of and a system for conveying data from a transmitting station to a receiving station by way of a fiber-optical transmission path interlinking these stations.

BACKGROUND OF THE INVENTION

Optical fibers are very suitable for data transmission because of their known properties of high signal speed, structural simplicity and low distortion. They also compare favorably with metallic transmission lines such as coaxial cables by their low attenuation, wide pass band and efficient shielding. They are generally used in conjunction with sources of luminous energy such as lassers or light-emitting diodes (LEDs) which can be readily pulsed but are difficult to modulate in amplitude with more than two distinct levels, i.e. low (L) and high (H).

The use of simple binary pulse trains for data transmission over any kind of signal path, optical or electrical, has certain drawbacks especially when the pulse rate must be reconstituted at the receiving end by the synchronization extractor. Thus, the rhythm may be lost upon the occurrence of a long series of identical pulses of logical value "0" or "1", also, since any bit combination has a specific numerical value, there is no way of detecting transmission errors from the configuration of the pulse train, in contrast to ternary or quaternary pulse trains which may provide a certain amount of redundancy but are unsuitable for clestro-optical systems. The frequency spectrum of a binary pulse train has a large d-c component and its energy is concentrated near the lower end of that spectrum. This causes considerable intersymbol interference if the input stage of the receiver is not equipped to handle direct current; in the case of a photodetector forming part of that receiver, as is necessary with fiber-optical transmission, short-term fluctuations of the d-c component may load that detector with transient biasing voltages giving rise to further distortions.

OBJECTS OF THE INVENTION

The general object of our present invention, therefore, is to provide a method of and means for conveying data over a fiber-optical path with avoidance of the aforestated drawbacks.

A more particular object is to provide a coding method for the modulation of luminous energy which is the optical equivalent of a ternary electrical pulse train, i.e. of a voltage (or current) varying between three distinct amplitude levels.

A related object is to provide means for efficiently demodulating such a luminous signal at a receiving end of a fiber-optical transmission path.

SUMMARY OF THE INVENTION

In accordance with our present invention, a light beam generated at a transmitting end of a fiber-optical transmission path is modulated in a series of cycles, of predetermined duration T, by changing its intensity between a first and a second amplitude level while limiting the occurrence of the second level (i.e. the high level H in the preferred case more fully described hereinafter) to not more than one-half of each cycle so as to produce a distinctive light pulse, of a width not exceeding T/2, in one or the other half-cycle or in neither of them. There is thus produced a ternary waveform modulated in both amplitude and time position which, if taken by itself, would be capable of distinguishing among input signals having three digital values. In order to facilitate the transmission of a large number of digital values from a multilevel signal source, we combine the ternary waveforms of two consecutive cycles into a waveform pair encompassing a coding period 2T; the resulting combination could represent any of nine different signal levels, yet we prefer to exclude the pair in which neither waveform contains the aforementioned pulse of distinctive amplitude (specifically the high level H) in order to avoid the possibility of a large number of pulses of the other type (specifically of the low level L) following one another without interruption. Thus, eight different data symbols corresponding to respective digital values can be converted with only the two amplitude levels L and H during any coding period 2T. We have found that, with our combined pulse-amplitude and pulse-position modulation (PAM/PPM), a given number of symbols can be transmitted and received at a theoretical rate which is 1.5 times as high as that available with simple PAM coding and that for an equivalent error probability we can operate with a significantly lower signal-to-noise ratio.

As will become apparent hereinafter, our bi-ternary code limits the number of consecutive pulses of like amplitude (level L) to a maximum of six when the system operates correctly. That code, moreover, has room for eight combinations not utilized whose appearance, therefore, can be interpreted as an error signal.

To demodulate the incoming luminous energy at the receiving end, i.e., at a remote terminal or at an intermediate repeater from which a reconstituted train of light pulses is to be retransmitted over a further section of the fiber-optical path, we generate a recurrent ramp signal of duration T synchronized with the modulating cycles at the transmitting end, that ramp signal serving to derive from the incoming light pulses a three-level electrical signal which is then sampled at a rate 1/T for obtaining therefrom ternary-signal pairs occurring in successive coding periods 2T and representing the digital values of corresponding input signals. Advantageously, before sampling, the electrical signals produced by the demodulator are integrated—again in synchronism with the modulation at the transmitting and—in a recurrent interval equal to T. The samples are compared with predetermined threasholds in a decision circuit and the result of comparison is forwarded to a load.

The synchronization of the coding and decoding operations at the transmitting and receiving ends may be facilitated by the sending of electrical or possibly luminous clock pulses from one station to the other over a separate signal path. The particular pulse configuration in the waveforms transmitted pursuant to our invention, however, obviates the need for such a separate signal path inasmuch as the synchronism can be readily extracted from the incoming light pulses. Thus, the frequency spectrum of the luminous pulse train no longer has an objectionable concentration of energy in the range of the lower frequencies and, in fact, contains a well-defined component of frequency $\frac{1}{2}T$, especially if the width of the high-level pulses is close to T/2. With a mean duty ratio well below 1:2, the system can operate with high peak power but relatively low average power which lengthens the service life of a laser or LED used as the light emitter at the transmitting end.

BRIEF DESCRIPTION OF THE DRAWING

The above and other features of our invention will now be described in detail with reference to the accompanying drawing in which.

SPECIFIC DESCRIPTION

Figure 1:
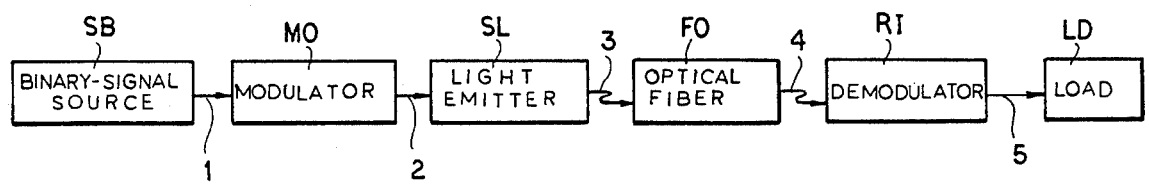
FIG. 1 is a block diagram of a data-transmission system embodying our invention.

In FIG. 1 we have shown a source SB of binary signals, specifically 3-bit code words (e.g. as used for digitizing an analog voltage of voice frequency) working through a lead 1 into a modulator MO whose output lead 2 extends to a light emitter SL of the aforedescribed kind, i.e. a laser or a LED. Luminous energy from light emitter SL forms a beam 3 which strikes the entrance end of an optical fiber FO constituting a signal path between a transmitting station including components SB, MO, SL and a receiving station including a demodulator RI and a load LD. Demodulator RI is illuminated by a beam 4 exiting from fiber FO and produces on a lead 5 an output signal which is numerically equivalent to the 3-bit code word generated by source SB. The light beam 3 can be pulsed in various ways under the control of modulator MO, either by an intermittent triggering of emitter SL or through the alternate opening and closing of a light gate in the output of that emitter. Such a light gate may comprise an electronic shutter including, for example, a Kerr or Pockels cell of birefringent material disposed between a polarizer and an analyzer with crossed polarization planes as is well known per se.

Figure 2:
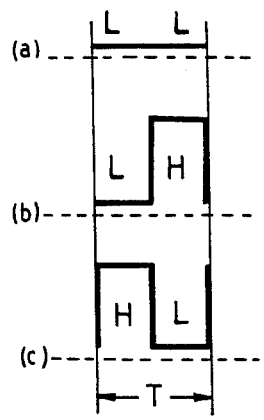
FIG. 2 is a set of graphs showing three waveforms used in that system.
Figure 6:
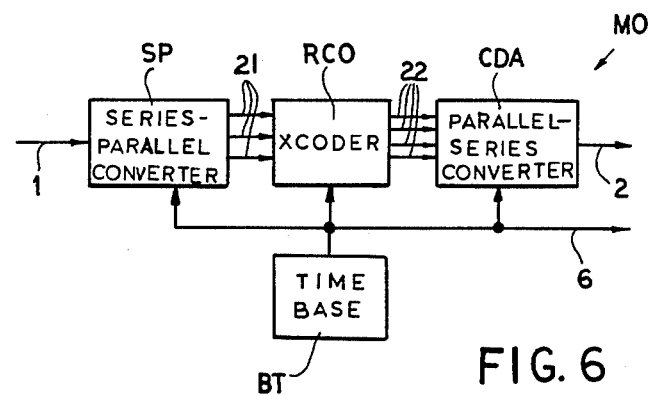
FIG. 6 is a block diagram showing details of a modulator included in the system of FIG. 1.

Graphs (a), (b) and (c) of FIG. 2 illustrate respective waveforms which may be generated by the modulator MO within a clock cycle T established by a time base BT (FIG. 6). The first waveform (a) has a low-amplitude level L (usually different from zero) in both halves of cycle T. The second waveform (b) has amplitude level L in the first half and a significantly higher amplitude level H in the second half of its cycle. In the third waveform (c) the relative position of levels H and L are reversed with reference to the second waveform (b).

Figure 3:
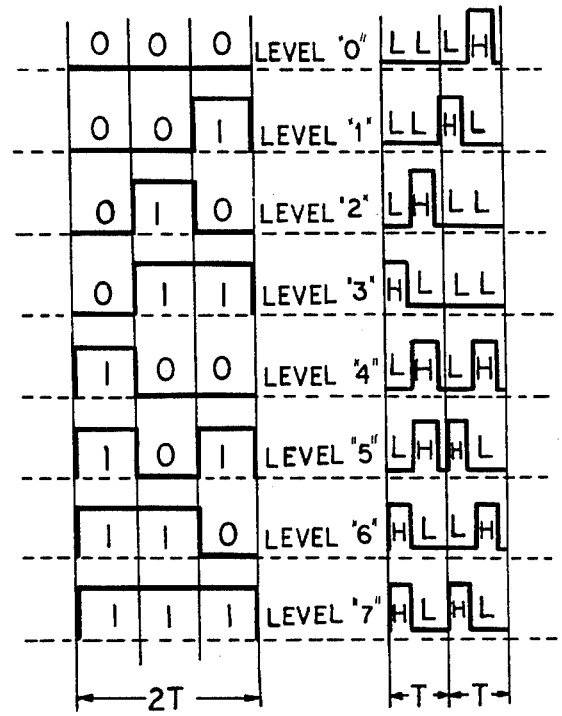
FIG. 3 is a set of graphs depicting the transcoding of three-bit words, representing eight different digital levels, into pairs of waveforms of the type shown in FIG. 2.

In FIG. 3 we have shown at left eight 3-bit words representing respective signal levels "0" through "7", generated in a two-cycle coding period of duration 2T. At right we have illustrated corresponding pairs of waveforms, selected from among those shown in FIG. 2, which are generated in consecutive cycles T to represent the same signal levels. Thus, level "0" is represented by the waveforms (a)/(b) of FIG. 2. Level "1" corresponds to the waveform pair (a)/(c). Pairs (b)/(a) and (c)/(a) respectively indicate levels "2" and "3". A duplication of waveform (b) corresponds to level "4". Level "5" is indicated by the pair (b)/(c). The reverse combination, i.e. the pair (c)/(b), stands for level "6". Finally, a duplication of waveform (c) represents the level "7".

It will thus be apparent that a maximum of six consecutive levels L could occur with any combination of successive 3-bit words, namely in the event when these words represent the digital levels "3" and "0". Not more than two pulses H can appear in immediate succession.

As clearly shown in FIG. 3, the code configuration used in each period 2T for modulating the outgoing luminous energy includes at least one but not more than two distinctive pulses of level H, not more than one such pulse appearing within any cycle T. These distinctive pulses are given a width slightly less than T/4 whereby a small gap exists in the configuration corresponding to level "5" or when two such pulses occur at the end of one coding period and at the beginning of the coding period immediately following, as when two successively transcoded words respectively represent the digital levels "0" and "3". Such a gap, however, is not essential for a recognition of the pulses at the receiving end.

Besides the eight coding configurations shown in FIG. 3, there are eight other possible configurations not utilized for data transmission including the all-L configuration present only when no information is being conveyed. An unused grouping such as L L H H, for example, would be indicative of a transmission error and could be detected by a malfunction indicator at the receiving end; such a malfunction indicator could comprise, for example, a counter determining whether more than one pulse (or a pulse of width greater than T/2) occurs in a clock cycle T.

FIG. 6 shows a specific embodiment of a modulator MO designed to translate the 3-bit words in the left-hand part of FIG. 3 into the code configurations of the right-hand part. This modulator comprises a series-parallel converter SP which receives the binary words over lead 1 from source SB (FIG. 1) and distributes their bits to three input leads 21 of a transcoder RCO, the latter having four output leads 22 extending to a parallel-series converter CDA. Transcoder RCO may comprise a gating matrix, or a read-only memory addressable by the selective energization of leads 21. All three components SP, RCO and CDA of this modulator are stepped by clock pulses from time base BT, generated on lead 6 and recurring at a cadence 1/T.

Figure 7:
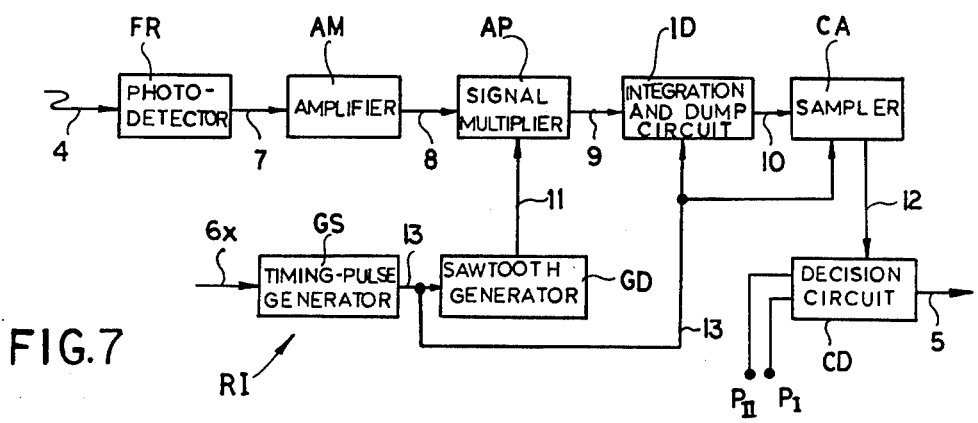
FIG. 7 is a block diagram of a receiver forming part of that system.
Figure 8:
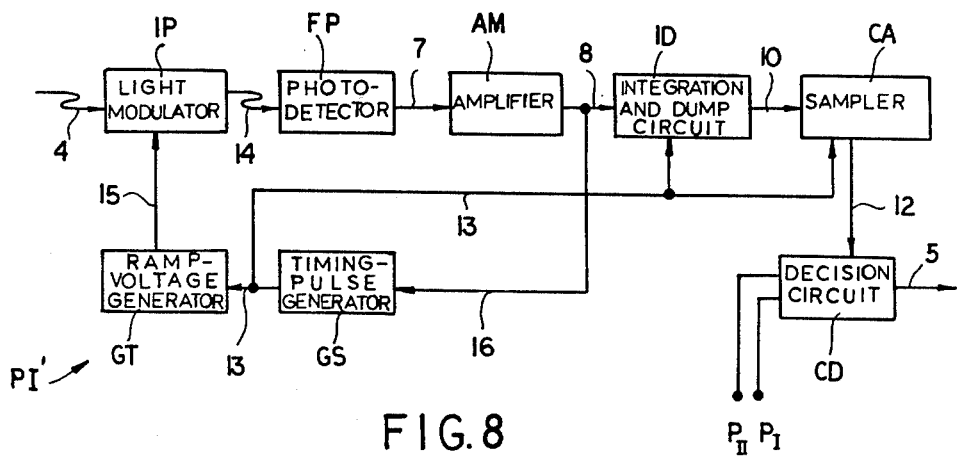
FIG. 8 is a block diagram similar to FIG. 7 but illustrating a modified receiver.

FIG. 7 illustrates a demodulator RI comprising a photodetector FR, confronting the exit end 4 of the fiber-optical transmission path FO (FIG. 1), which works via a lead 7 into an amplifier AM feeding a signal multiplier AP by way of a lead 8. A timing-pulse generator GS, designed to synchronize the components of demodulator RI with the time base BT of the modulator MO at the remote transmitting station, is here shown connected to an extension 6x of the lead 6 carrying the clock pulses generated by that time base (see FIG. 6). Extension 6x may be linked with lead 6 by a metallic transmission line or by an ancillary fiber-optical path. Such an additional link between the transmitting and receiving stations, however, can be omitted if generator GS comprises a sync-pulse extractor operating on the output signal of amplifier AM as illustrated in FIG. 8;

the recovery of the clock-pulse cadence through such an extractor is facilitated by the fact that the leading and trailing edges of pulses H (FIGS. 2 and 3) are separated by about a half-cycle T/2, giving rise to a strong frequency component of period T/4 as noted above.

Figure 4A:
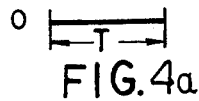
FIGS. 4a, 4b and 4c show signal pulses derived from incoming waveforms with the aid of a ramp signal.
Figure 4B:
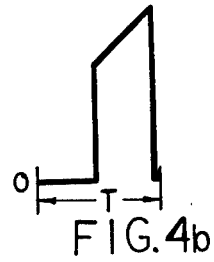
Figure 4C:

Pulse generator GS has an output lead 13 extending to a sawtooth-wave generator GD as well as to two components downstream of multiplier AP, namely an integration and dump circuit ID and a sampler CA. Sawtooth generator GD delivers a ramp signal, rising and terminating within an interval of the same duration T as a clock cycle though possibly offset therefrom, to circuit AP which multiplies the output voltage of amplifier AM by this ramp signal as illustrated in FIGS. 4a–4c. When the incoming beam is at its low level L throughout the timing interval T, corresponding to waveform (a) of FIG. 2, the multiplication product appearing at an output lead 9 of circuit AP has zero amplitude as indicated in FIG. 4a. When a pulse H appears in the second half of a timing interval, according to waveform (b) of FIG. 2, a large voltage pulse appears on lead 9 as shown in FIG. 4b. When the same pulse H occurs in the first half of interval T, as per waveform (c) of FIG. 2, the resulting voltage pulse is considerably smaller as shown in FIG. 4c.

Figure 5A:
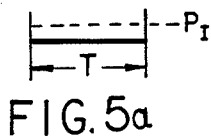
FIGS. 5a, 5b and 5c show the signals of FIGS. 4a, 4b and 4c integrated over an interval T.
Figure 5B:
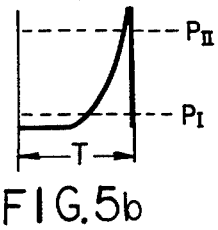
Figure 5C:
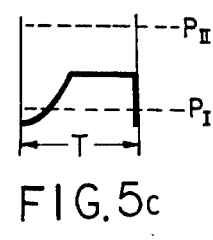

The integration and dump circuit ID of FIG. 7, connected to output lead 9 of multiplier AP, integrates the voltage pulses so generated over the interval T to produce respective voltage shapes as shown in FIGS. 5a, 5b and 5c. The voltage of FIG. 5a falls short of a first threshold potential $P_I$ and is therefore classified as "low". The voltage of FIG. 5b surpasses that potential as well as a second threshold potential level $P_{II}$, being thus classified as "high". The voltage of FIG. 5c falls between thresholds $P_I$ and $P_{II}$, being thus classified as "intermediate".

At the end of each integration interval T, sampler CA opens a gate for passing the accumulated voltage present on an output lead 10 of integrator ID to an output lead 12 of a decision circuit CD receiving the two threshold potentials $P_I$ and $P_{II}$ referred to above. Circuit CD then transmits to the load LD (FIG. 1), via its output lead 5, the two ternary signals (low/intermediate/high) generated in a period 2T by a comparator within that circuit receiving the voltage samples emitted by circuit CA. Load LD may include another transcoder which converts these two ternary samples into a 3-bit word as shown at left in FIG. 3 or directly into the corresponding signal level.

FIG. 8 represents a somewhat different demodulator RI' according to our invention in which a gradually rising and sharply falling voltage or current from a ramp-signal generator GT, similar to generator GD of FIG. 7, is delivered under the control of timing-pulse generator GS via a lead 15 to a light modulator IP interposed between the exit end 4 of the fiber-optical transmission path and the photodetector FR. Light modulator IP may comprise an electronic shutter of the type referred to above in connection with the light emitter SL of FIG. 1. Thus, a field produced by ramp-signal generator GT can be applied to a birefringent solid or crystal for progressively increasing the transmissivity of the light gate throughout an interval T whereby a light pulse occurring in the first half of such an interval is attenuated with reference to a light pulse occurring in the second half, substantially in the manner of the electrical pulses respectively illustrated in FIGS. 4c and 4b. The light thus modulated is conveyed as a beam 14 to the photodetector FR feeding the amplifier AM which delivers voltages similar to those of FIGS. 4a, 4b, 4c to integrating and dump circuit ID with omission of signal multiplier AP. The remainder of receiver RI' is identical with that of receiver RI in FIG. 7.

The modulation code described with reference to FIG. 3 is given, of course, only by way of example. The various signal levels could be assigned to the several illustrated configurations in a different order without deviating from the principles described.

We claim:

1. A method of conveying data over a fiber-optical transmission path having a transmitting end and a receiving end, comprising the steps of:
   generating luminous energy at the transmitting end;
   establishing a series of clock cycles of predetermined length T which define successive coding periods of duration 2T;
   modulating said luminous energy by changing its intensity in at least one clock cycle T of any coding period 2T from a first to a second amplitude level to generate a distinctive pulse while limiting the width of said distinctive pulse to a maximum of T/2 with maintenance of said first amplitude level in at least one half of each clock cycle;
   selecting the number of distinctive pulses and the time position thereof within each coding period in accordance with the digital values of input signals from a multilevel source pursuant to a predetermined modulation code;
   transmitting the luminous energy so modulated over the fiber-optical path to the receiving end;
   generating at said receiving end a recurrent ramp signal of duration T synchronized with said clock cycles;
   deriving from luminous energy arriving at said receiving end, with the aid of said ramp signal, a three-level electrical signal for each clock cycle;
   sampling said three-level interval at a rate 1/T; and
   comparing the resulting samples with predetermined thresholds for obtaining therefrom ternary-signal pairs occurring in successive periods 2T and representing the digital values of corresponding input signals.

2. The method defined in claim 1 wherein said first amplitude level is low and said second amplitude level is high.

3. The method defined in claim 1 or 2 wherein the arriving luminous energy is converted into an electrical pulse train whose pulses are multiplied by said ramp signal to yield said three-level signal.

4. The method defined in claim 1 or 2 wherein the arriving luminous energy is further modulated by said ramp signal before being converted into said three-level signal.

5. A system for conveying data from a transmitting station to a receiving station by way of a fiber-optical path interlinking said stations, comprising:
   a source of multilevel input signals at said transmitting station;
   a light emitter at said transmitting station positioned to illuminate an entrance end of said transmission path;
   modulating means connected to said light emitter for generating, in a series of clock cycles of predetermined length T defining successive coding periods of duration 2T, distinctive light pulses of a width not exceeding T/2 occurring not more than once per clock cycle but appearing in at least one clock cycle of each coding period, said modulating means including circuitry connected to said source for translating digital values represented by the levels of said input signals into variations in the number of distinctive pulses and the time position thereof within each coding period pursuant to a predetermined modulation code;

a ramp-signal generator at said receiving station synchronized with said modulating means to produce one ramp signal of duration T per clock cycle;

demodulating means at said receiving station including a photodetector confronting an exit end of said transmission path, said demodulating means being controlled by said ramp-signal generator for deriving from incoming luminous energy a three-level electrical signal;

sampling means synchronized with said modulating means and connected to said demodulating means for obtaining samples of said three-level signal during successive intervals T; and decision means connected to said sampling means for comparing each of said samples with predetermined thresholds to generate ternary-signal pairs occurring in successive periods 2T and representing the levels of corresponding input signals.

6. A system as defined in claim 5, further comprising integrating means inserted between said demodulating means and said sampling means, said integrating means being synchronized with said modulating means for establishing a recurrent integration interval of duration T.

7. A system as defined in claim 5 or 6 wherein said demodulating means further comprises a signal multiplier with input connections to said photodetector and to said ramp-signal generator.

8. A system as defined in claim 5 or 6 wherein said demodulating means further comprises a light modulator connected to said ramp-signal generator, said light modulator being inserted between said transmission path and said photodetector for periodically varying the intensity of incoming light pulses.

9. A system as defined in claim 5 or 6 wherein said modulating means comprises a transcoder with three input leads and four output leads, a series-parallel converter inserted between said source and said input leads for loading said transcoder with a three-bit word during any coding period, and a parallel-series converter inserted between said output leads and said light emitter for translating an energized condition of any of said output leads into a pulse occupying a corresponding time position of a coding period.

* * * * *